United States Patent [19]

Johnson

[11] Patent Number: 4,542,687
[45] Date of Patent: Sep. 24, 1985

[54] GREEN PEANUT DESTEMMER AND WASHER

[75] Inventor: Reaves Johnson, Smithville, Ga.

[73] Assignee: RJM, Inc., Ocala, Fla.

[21] Appl. No.: 698,012

[22] Filed: Feb. 4, 1985

[51] Int. Cl.⁴ ............................................. A23N 15/00
[52] U.S. Cl. ....................................... 99/639; 99/536; 99/637; 426/484
[58] Field of Search ................. 99/485, 516, 536, 547, 99/567, 635–637, 639, 641–643; 426/481, 484

[56] References Cited

U.S. PATENT DOCUMENTS

| | | | |
|---|---|---|---|
| 3,322,173 | 5/1967 | Snow | 99/536 |
| 3,677,315 | 7/1972 | Cox | 99/639 X |
| 4,029,005 | 6/1977 | Derderian | 99/639 |
| 4,125,067 | 11/1978 | Peruffo et al. | 99/639 |
| 4,430,933 | 2/1984 | Boots | 99/536 |

FOREIGN PATENT DOCUMENTS 183191  3/1936  Fed. Rep. of Germany ........ 99/536

Primary Examiner—Timothy F. Simone

[57] ABSTRACT

Apparatus for removing stems from picked green peanuts and for removing dirt and debris therefrom. Green peanuts are fed into a destemmer having a sloping plate with a plurality of slots through which rotating slotted destemmer wheels project. The stems are caught in the wheel slots and separated from the peanuts as the wheels rotate through the plate slots. The destemmed peanuts are deposited in a washing tank in which rotating cylindrical brushes force the peanuts under water, removing dirt and debris. The peanuts move to an upwardly inclined conveyor belt which carry the peanuts to a packaging station.

8 Claims, 4 Drawing Figures

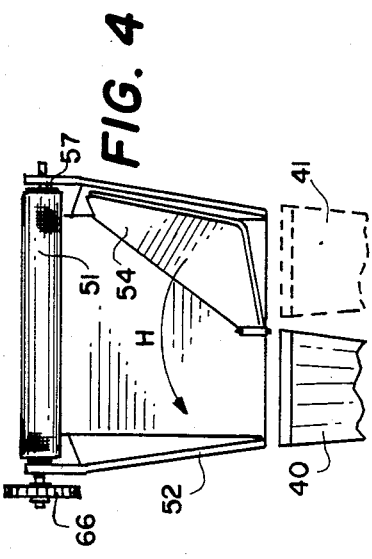
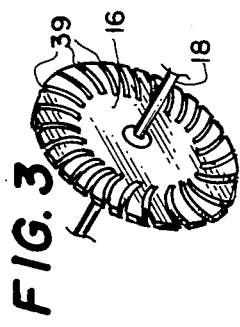
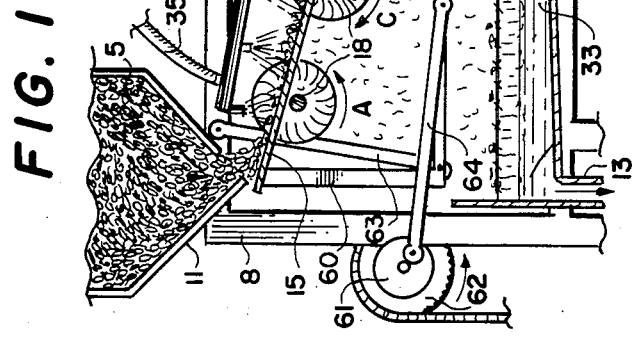
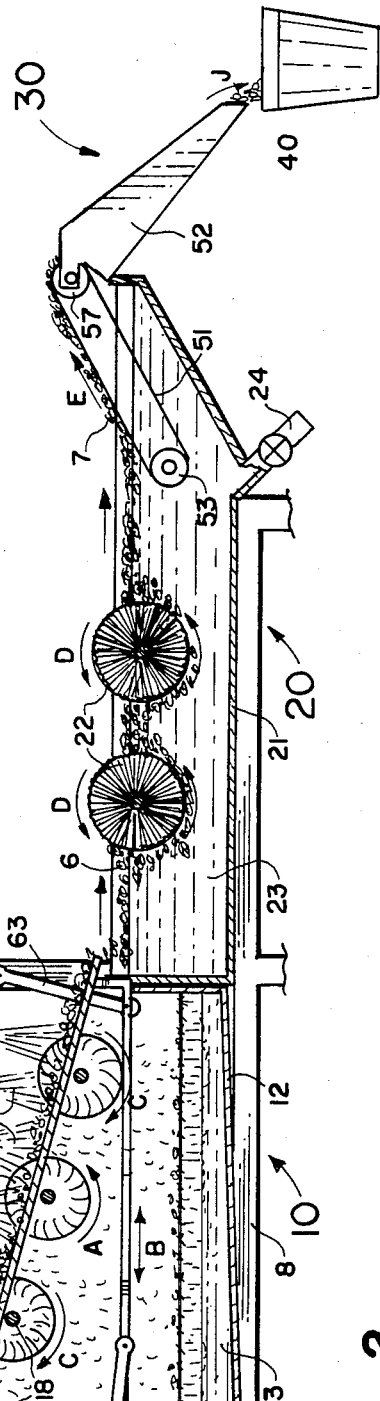
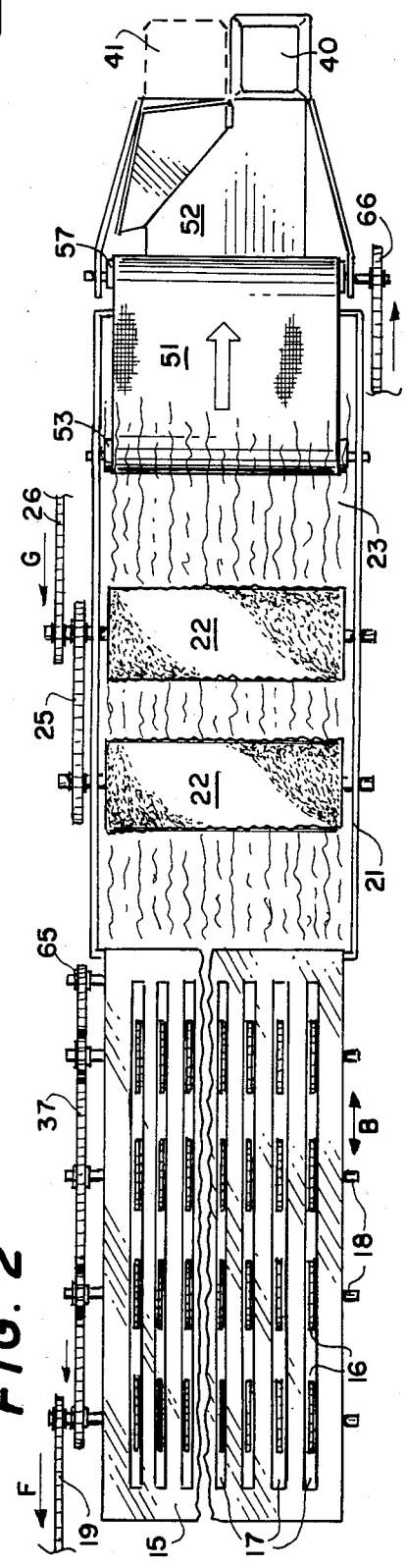

GREEN PEANUT DESTEMMER AND WASHER

BACKGROUND OF THE INVENTION

1. Field of the Invention

The present invention relates to processing of green peanuts, and more particularly to apparatus for removing the stems from green peanuts and washing the peanuts to remove dirt from the shells.

2. Description of the Prior Art

There is a large market for green peanuts from which boiled peanuts are produced. Conventionally, such peanuts are manually harvested by digging up the peanut vines in which the peanuts cling to the roots of the vines. Manual labor is then utilized to pick the green peanuts from the vines and to deposit them in field boxes. When the peanut is green, the stem is firmly attached to the end of the peanut. During the picking operation, the stem is most likely to be broken loose from the root rather than from the peanut, leaving stems of various lengths still attached to the peanuts. In harvesting the peanut vines and roots, unavoidably a large amount of soil adheres to the roots. Although an attempt is made by the pickers to knock off soil, the picked peanuts invariably have damp soil clinging to the still damp shells. In the past, it has been the practice to deliver the picked and dirty peanuts to the packing house and to have additional labor manually remove the stems and wash the peanuts in tubs of water. This process is slow, costly in labor, and results in a poor quality of packed green peanuts. The value of the packed peanuts is determined to great extent by the cleanliness and freedom from stems.

There has been a long felt and unfilled need for apparatus which will effectively removes stems from the peanuts at a high rate, which will thoroughly wash essentially all of the soil from the shells and which will automatically pack the peanuts in crates or hampers, thereby eliminating manual destemming, washing and packing.

SUMMARY OF THE INVENTION

My invention is a novel automatic green peanut destemmer and washer apparatus which will deliver very clean green peanuts completely destemmed directly to the packing crates. The apparatus comprises three elements operating in sequence.

The first element is a destemmer and prewasher in which the stems are removed from the green peanuts. Next, a final washer section effectively scrubs the peanut shells to remove essentially all of the soil therefrom. The third element is a conveyor system which picks up the destemmed and cleaned peanuts and delivers the same to a crate or hamper. The conveyor section includes a novel diverter device which permits continuous filling of crates.

The destemmer and prewasher portion of my invention includes a large hopper into which the picked peanuts are dumped. Although not a part of my invention, the hopper may be fed from a conventional conveyor on which peanuts are dumped from the pickers' field boxes. From the hopper, the peanuts are fed by gravity onto a sloping plate having a plurality of longitudinal slots running the entire length of the plate. The plate is suspended on a set of rocker arms and is oscillated by an eccentric. A plurality of transverse shafts is provided disposed just beneath the sloping plate. Each shaft includes a row of destemmer wheels disposed thereon and projecting upward through each longitudinal slot. Each destemmer wheel is a thin metal disc which may be on the order of 7 inches in diameter having a plurality of closely spaced curved slots completely around the periphery of the wheel producing an appearance somewhat like a circular saw blade. As will be recognized, the several sets of destemmer wheels are disposed in tandem along the slots in the plate.

As the peanuts are fed onto the plate, the oscillations thereof move the peanuts into the slotted wheels. The slots in the destemmer wheels will catch the stems of the peanuts and, as the wheels rotate through the slots, the stems will be removed. The width of the slots is less than the width of a peanut and may be on the order of ¼ inch. Therefore, the stems may pass through the slots with the peanuts remaining on top of the plate. Alternate rows of destemmer wheels are rotated in opposite direction and at a sufficient speed to perform the destemming operation I have found that a speed of 70 rpm is suitable.

To assist in the movement of the peanuts down the plate as well as to soften the stems to make removal easier, a series of manifolds having a multiplicity of spray heads therein is mounted above the destemmer wheels. Water under pressure is ejected from the spray heads which strikes the peanuts and also assists in washing the stems and debris or soil through the slots. A tank is disposed below the plate having a horizontal screen disposed below the destemmer wheels. The water passes through the screen to a drain while the debris and stems are caught by the screen. The screen is removable to permit occasional cleaning out of the stems. As the destemmed peanuts reach the lower end of the slotted plate, they drop into a large water filled washing tank. The peanuts, being lighter than water, float on the surface of the water in the tank of the washer section. A pair of cylindrical brushes is mounted laterally across the washer tank having approximately the upper half of the cylindrical brushes projecting above the water level in the tank. The brushes are rotating in a reverse direction from the movement of the peanuts through the tank. As the bristles of the brushes contact the peanuts, they are forced beneath the water and toward the output end. The combination of the brushing and the water effectively removes the soil from the shells. The mass of floating peanuts is urged through the tank to the discharge end thereof by the rotating brushes. A belt type conveyor is disposed at the discharge end of the washing tank and is placed at an angle with the surface of the water such that the forward end is below the water level surface and outer end is above the water level surface. As will be recognized, the movement of the water toward the discharge end carries the peanuts onto the lower end of the conveyor belt which is moving in a direction to carry the peanuts upward from the tank. At the upper end of the conveyor, a wide chute is provided into which the peanuts are dumped.

Advantageously, the lower end of the chute has a width slightly greater than two packing crates or hampers placed side by side. A diverter plate is hingedly attached at the midpoint of the lower outlet end of the chute and is adapted to be swung to one side or the other. In use, the diverter panel is placed in one position and an empty basket or hamper is placed adjacent the other side of the chute. All destemmed and cleaned peanuts will then be directed into the hamper. As a hamper fills, a second hamper is placed in position on the other side of the chute. When the proper amount is in the active hamper, the diverter plate is flipped to the other side at which time the peanuts will be directed into the empty hamper. As will be recognized, filling of hampers can be continuous with no interruptions or spillage of peanuts as a hamper becomes full.

It is therefore a principal object of my invention to provide an automatic destemmer and washer into which green peanuts may be introduced and which will quickly and cleanly remove the stems therefrom, will thoroughly wash the peanuts to remove adhered soil, and thereafter will be deliver the destemmed and washed peanuts to packing hampers.

It is another object of my invention to provide a green peanut destemmer and washer which will produce high quality, clean peanuts.

It is still another object of my invention to provide a destemmer utilizing a plurality of destemming wheels having slots therein which serve to catch and remove the stems from the peanuts, and a washing tank having rotary brushes for removing soil from the peanut shells.

It is still another object of my invention to provide a green peanut destemmer and washer which is capable of delivering clean destemmed green peanuts to packing hampers on a continuous basis.

These and other objects and advantages of my invention will become apparent from the following detailed description when read in conjunction with the drawings.

BRIEF DESCRIPTION OF THE DRAWINGS

FIG. 1 is a cross-sectional side view of the green peanut destemming and washing apparatus of the invention;

FIG. 2 is a top view of the apparatus of FIG. 1;

FIG. 3 is a perspective view of a typical destemming wheel in accordance with my invention; and FIG. 4 is a view of the output chute of the apparatus of FIGS. 1 and 2 showing the operation of the diverter panel.

DETAILED DESCRIPTION OF THE PREFERRED EMBODIMENT

Referring to FIG. 1, a cross-sectional view of a preferred embodiment of my green peanut destemmer and washing apparatus is shown. The basic elements are: an input hopper 11; a destemming section 10; a washing section 20; and an output delivery section 30. A support structure 8 is provided for mounting of these elements.

Hopper 11 may be any suitable system for feeding bulk quantities of picked green peanuts 5 to the destemmer portion 10. Preferably, hopper 11 is kept full to provide a positive gravity flow of the green peanuts into the destemming portion 10. Destemming portion 10 utilizes a tank 12 having a sloping plate 15 essentially closing the top thereof. Plate 15 is mounted to a frame 60 (shown partially in FIG. 1) which is suspended from support structure 8 by a set of rocker arms 63. Frame 60 is connected to a drive arm 64 which is driven by eccentric 61 mounted to sprocket 62. As eccentric 61 rotates, plate 15 oscillates as indicated by arrows B. Referring to the top view of FIG. 2 in which the support structure 8 and other elements have been omitted for clarity, plate 15 may be seen to have a plurality of slots 17 running longitudinally for essentially the entire length thereof. A plurality of driveshafts 18 is disposed laterally slightly below plate 15 along which is mounted a plurality of destemming wheels 16. A typical destemming wheel 16 is shown in perspective view in FIG. 3 and may be noted to be a thin disc having a plurality of curved slots 39 cut in the periphery thereof. Wheels 16 may be 7 inches in diameter. In the top view of FIG. 2, it may be noted that there are destemmer wheels disposed in each of the slots 17 in plate 15. The spacing of the destemmer wheels 18 and the widths of slots 17 are selected such that peanuts will not fall through slots 17 but stems separated from the peanuts may drop through. The width of slots 17 may be ¼ inch, for example; the slots and spacing thereof in FIG. 2 being somewhat exaggerated for clarity. A set of manifolds 36 is disposed above plate 15 having a plurality of water jets 31 along each manifold. A connection 35 is made to a source of water under pressure. Manifolds 36 and water jets 31 are distributed such that jets of water 32 will essentially cover the entire plate 15.

From FIG. 2 it may be noted that shafts 18 are innerconnected by sprockets and chains 37 and driven by chain 19 in the direction of the arrow F. Preferably, destemmer wheels 16 are rotated at about 70 rpm by any suitable means. The first and third rows of destemmer wheels 16 are rotated in the direction indicated by arrows A while the second and fourth rows are rotated in the opposite direction (arrows C). Drive chain 37 passes around the sprocket for the first row, underneath the sprockets for the second and fourth rows, over the sprocket for the third row and around idler sprocket 65. As will be understood, the number of rows of destemmer wheels 16 may be increased, although I have found that four or five rows will destem the majority of peanuts fed through the apparatus. In operation, green peanuts 5 having stems and soil adhering thereto in hopper 11 feed only plate 15 by gravity and will be urged down plate 15 the vibration or oscillation of plate 15, by water jets 32 and by wheels 16. As the peanuts contact the rotating destemmer wheels 16, the curved slots 39 catch the peanut stems and, as a curved slot 39 enters a plate slot 17, the stem will be pulled from the peanut. The water jets 32 assist in movement of the peanuts downward by providing a slippery surface on plate 15 as well as a force to move the peanuts. As the stems are pulled from the peanuts, they fall between slots 17 into tank 12.

A removable screen 14 is disposed horizontally in tank 12 and serves to catch the stems and other debris separated from the peanuts. Water 33 in tank 12 from manifold 36 is drained by outlet 13. As the peanuts move down plate 15, I have found that almost every peanut with a stem will have the stem removed. As mentioned above, the number of destemming wheels 16 and the number of shafts 18 may be selected in accordance with the volume and rate of destemming desired. For example, I have found that by providing four shafts 18 with twenty four destemming wheels 16 on each and with slot widths 17 of ¼ inches, a volume of approximately 125 bushels per hour can be destemmed. Also, I have found that the use of water jets 32 increases the efficiency of the destemming operation since the water assists in softening the connection of the stem to the shell. In addition, water jets 32 serve as a prewasher and some soil is removed from the peanuts and falls into tank 12.

The peanuts are deposited from plate 15 into washing tank 21. Tank 21 includes a pair of cylindrical rotary brushes 22 supported transverse to the tank 21. Tank 21 is filled with water 23 to a level slightly above the center line of brushes 22. As noted from FIG. 2, brushes 22 are coupled by chain 25 and driven by any desired means by chain 26 moving in the direction of the arrow G. The brushes rotate counter clockwise in the cross-sectional view of FIG. 1 as indicated by the arrows D. As the destemmed peanuts 6 enter water 23, they, of course, float and will be forced underwater by brushes 22 and moved toward the discharge end of tank 21. Due to the turbulence of the water created by the brushes 22 as well as the contact of bristles of brushes 22 with the shells of the peanuts as they float into the brushes, any soil or other material clinging to the shell will be removed and will settle in tank 21. A drain 24 is provided for periodically draining and cleaning tank 21.

As the destemmed and cleaned peanuts 7 leave the brushes 22 they are moved in the direction of the arrow to the discharge end of tank 21. A flat belt conveyor 51, seen in cross-section in FIG. 1, riding on rollers 53 and 57 has the lower end roller 53 submerged below the level of water 23. Conveyor 51 is driven by chain and sprocket 66 from any suitable power source. The upper end roller 57 of conveyor 51 is elevated and is clear of water 23. Thus, the destemmed and clean peanuts 7 will be picked up by the surface of conveyor belt 51 and carried to the top end of the conveyor as indicated by arrow E. Here, a chute 52 is disposed into which the cleaned and destemmed peanuts are dropped. At the lower end of chute 52, hampers 40 may be positioned to catch the peanuts 7 as shown by arrow J.

As may be noted from the top view of FIG. 2, the width of chute 52 at its lower output end will accommodate two hampers side by side. A diverter plate 54 is hinged at a point at the center of the lower end of chute 52. As seen in the end view of FIG. 4, diverter plate 54 will swing about hinge 55 from the right side to the left side as indicated by arrow H and the dashed lines. When diverter plate 54 is in the position indicated in the top view of FIG. 2, it may be seen that the peanuts 7 will be diverted to hamper 40. As that hamper becomes full, an empty hamper 41 may be placed as shown by the dashed lines, and diverter plate 54 swung to the opposite side at which point the flow of peanuts 7 will be diverted into empty hamper 41. Therefore, a continuous flow of peanuts to the packing containers can be maintained without spillage or stopping of the process.

I prefer that drives 62, 19 and 26 can be powered by an electric motor although any other suitable means may be used. Although I have described the invention with reference to the disclosed preferred embodiment, many modifications and variations may be made without departing from the spirit or scope of the invention.

I claim:

1. Apparatus for destemming and washing green peanuts comprising:
   (a) a support structure;
   (b) a destemmer section mounted on said support structure and having an input end and an output end, said destemmer section including
      (i) a frame movably suspended from said support structure by a set of rocker arms,
      (ii) a plate attached to said frame and sloping downward from said input end to said output end of said destemmer section, said plate having a plurality of parallel slots therethrough extending essentially from said input end to said output end,
      (iii) a plurality of drive shafts disposed transverse to and below said plate,
      (iv) a plurality of circular destemmer wheels mounted on and concentric with each of said drive shafts, an upper portion of each of said wheels extending upward through said slots, each of said destemmer wheels having a plurality of curved slots around the periphery thereof, and
      (v) driving means for rotating said drive shafts with alternate shafts being rotated in opposite directions whereby green peanuts introduced onto said plate at said input end are destemmed and moved to said output end;
   (c) an elongate washing tank mounted on said support structure and having an input end and an output end, said input end contiguous with said destemmer section output end for receiving destemmed peanuts, said tank for containing washing water;
   (d) at least one cylindrical rotary brush disposed within and transverse to said washing tank having an upper portion thereof extending above the level of said washing water;
   (e) means for rotating said brush wherein said upper portion thereof rotates toward said input end of said washing tank thereby washing destemmed peanuts and moving same to said output end of said tank; and
   (f) conveyor means disposed at said output end of said washing tank and having an input end disposed below the level of said washing water and an output end disposed above the level of said washing water, said conveyor means for removing destemmed and washed peanuts from said washing tank for collecting and packing thereof.

2. The apparatus as defined in claim 1 which further comprises oscillation means mounted on said support structure and coupled to said frame for oscillating said frame and plate with respect to said support means.

3. The apparatus as defined in claim 1 which further comprises water spray means disposed above said plate for spraying water onto said plate.

4. The apparatus as defined in claim 3 which further comprises drain means disposed below said plate for receiving water from said spray means.

5. The apparatus as defined in claim 1 which further comprises a screen disposed below said plate for receiving stems and debris from said destemmed peanuts.

6. The apparatus as defined in claim 1 which further comprises:
   a downwardly sloping chute disposed adjacent said output end of said conveyor means; and
   a diverter plate hingedly attached to said chute, said diverter plate having a first position to direct peanuts to a first container, and a second position to direct peanuts to a second container.

7. The apparatus as defined in claim 1 which further comprises a hopper disposed adjacent said input end of said destemmer section for holding green peanuts and feeding same to said destemmer section.

8. Apparatus for destemming and washing green peanuts comprising:
   (a) a support structure;
   (b) a destemmer section mounted on said support structure and having an input end and an output end, said destemmer section including
      (i) a frame movably suspended from said support structure by a set of rocker arms,
      (ii) a plate attached to said frame and sloping downward from said input end to said output end of said destemmer section, said plate having a plurality of parallel slots therethrough extending essentially from said input end to said output end, (iii) a plurality of drive shafts disposed transverse to and below said plate, (iv) a plurality of circular destemmer wheels mounted on and concentric with each of said drive shafts, an upper portion of each of said wheels extending upward through said slots, each of said destemmer wheels having a plurality of curved slots around the periphery thereof, (v) driving means for rotating said drive shafts with alternate shafts being rotated in opposite directions whereby green peanuts introduced onto said plate at said input end are destemmed and moved to said output end;

(vi) a water manifold disposed above said plate, (vii) a plurality of water jets attached to said manifold and adapted to spray water over the upper surface of said plate, (viii) a tank having a drain disposed beneath said plate for receiving and draining water from said manifold and jets, and (ix) means attached to said support structure and connected to said frame for oscillating said plate to thereby cause green peanuts to move down said plate;

(c) an elongate washing tank mounted on said support structure and having an input end and an output end, said input end contiguous with said destemmer section output end for receiving destemmed peanuts, said tank for containing washing water to a preselected level;

(d) at least one cylindrical rotary brush disposed within and transverse to said washing tank and having an upper portion thereof extending above the level of said washing water;

(e) means for rotating said brush wherein said upper portion thereof rotates toward said input end of said washing tank thereby contacting destemmed peanuts, removing soil therefrom the peanuts and moving to said output end of said tank;

(f) conveyor means disposed at said output end of said washing tank and having an input end disposed below the level of said washing water and an output end disposed above the level of said washing water, said conveyor means for removing destemmed and washed peanuts from said washing tank;

(g) a downwardly inclined chute having an input end disposed adjacent said output end of said conveyor means for receiving destemmed and washed peanuts, and a lower output end; and (h) a diverter plate hingedly attached to said chute, said diverter plate having a first position to direct peanuts from said conveyor means moving down said chute to a first container adjacent said lower output end, and a second position to direct such peanuts to a second container adjacent said first container.

* * * * *